United States Patent [19]

Wang

[11] Patent Number: 5,313,979
[45] Date of Patent: May 24, 1994

[54] FOUNTAIN FAUCET

[76] Inventor: Wen-Chang Wang, No. 208-13, Shang Lun Tsun, Jen Te Hsiang, Tainan Hsien, Taiwan

[21] Appl. No.: 48,910

[22] Filed: Apr. 20, 1993

[51] Int. Cl.⁵ .......................... F16K 15/18; F16K 31/14; F16K 31/24; F16K 31/53
[52] U.S. Cl. ............................. 137/390; 137/410; 137/423; 137/430; 137/446; 137/448; 251/65; 251/82; 251/249.5
[58] Field of Search ................ 137/181, 390, 409, 410, 137/420, 421, 423, 430, 433, 434, 446, 448; 251/65, 67, 73, 74, 82, 83, 248, 249.5

[56] References Cited

U.S. PATENT DOCUMENTS

| | | | |
|---|---|---|---|
| 1,336,288 | 4/1920 | Elliott | 137/390 |
| 1,407,800 | 2/1922 | Muzzy | 137/390 |
| 1,418,845 | 6/1922 | Stetson | 137/390 |
| 1,432,103 | 10/1922 | Feller | 137/390 |
| 2,022,430 | 11/1935 | Nold | 137/390 |
| 2,091,228 | 8/1937 | Hann | 137/421 |
| 2,091,700 | 2/1940 | Stetson | 137/390 |
| 2,571,367 | 10/1951 | Judell | 137/390 |
| 3,105,511 | 10/1963 | Murphy, Jr. | 251/65 |
| 3,105,512 | 10/1963 | Lyall et al. | 251/65 |
| 3,136,332 | 6/1964 | Nixon | 251/65 |
| 3,202,174 | 8/1965 | Rudelick | 251/65 |
| 3,467,135 | 9/1969 | Muskalla | 137/433 |
| 3,796,227 | 3/1974 | Fujiwara | 137/390 |
| 4,335,734 | 6/1982 | Trinkwalder | 137/390 |
| 4,360,038 | 11/1982 | Trinkwalder, Jr. | 137/390 |
| 4,655,244 | 4/1987 | Park | 137/423 |
| 4,694,860 | 9/1987 | Eidsmore | 251/65 |
| 4,836,239 | 6/1989 | Kinkead | 251/65 |

FOREIGN PATENT DOCUMENTS 608316 1/1935 Fed. Rep. of Germany ...... 137/390

*Primary Examiner*—George L. Walton
*Attorney, Agent, or Firm*—Pro-Techtor International

[57] ABSTRACT

A fountain faucet is comprised of a housing defining a water chamber and having an inlet communicating the water chamber and an outlet communicating the water chamber through an opening, a float valve disposed in the water chamber and movable between valve open and valve closed positions. A control unit engaged in the housing by means of a thread operable to retain the float valve in its closed position or allow the float valve movable freely between the valve open and valve closed positions.

5 Claims, 4 Drawing Sheets

FOUNTAIN FAUCET

BACKGROUND OF THE INVENTION

The present invention relates to a fountain faucet and more particularly to a fountain faucet having a float valve which automatically shuts off the fountian faucet to prevent water from running waste.

Nowadays, fountain faucets are provided for controlling water flow of water pipes. Sometimes fountain faucets may be left open when water supply is shut off. Once the water supply is restored, water may keep running to waste until someone pays attention to it and turns the faucet off. It is therefore desirable to provide an effective means to automatically close a fountain faucet which is either left open or properly closed.

My U.S. Pat. No. 5,159,950 illustrates a fountain faucet operable to automatically shut off water supply for preventing water from running waste. The fountain faucet consists of a housing defining a water chamber and having an inlet communicating the water chamber and an outlet communicating the water chamber through an opening, a float valve hinged within the water chamber for a swinging movement between valve open and valve closed positions, a control unit engaged in the housing by means of a thread operable to retain the float in its closed position or allow the float valve swingable freely between the valve open and valve closed positions.

This device has the disadvantage in its release operation. For example, an operating knob of the control unit should be threaded to move a spindle axially downwardly to its lowermost position so as to release the float valve which is retained in its closed position by a retainer so that the float valve can rise to lay open the opening between the water chamber and outlet and restore the control functions of the device.

OBJECT OF THE INVENTION

Accordingly, it is a primary object of the present invention to provide a fountain faucet which overcomes the foregoing defect associated with the prior art.

Other objects of the invention will be apparent from the description and specifications hereinafter set forth.

DETAILED DESCRIPTION OF THE PREFERRED EMBODIMENTS

Figure 1:
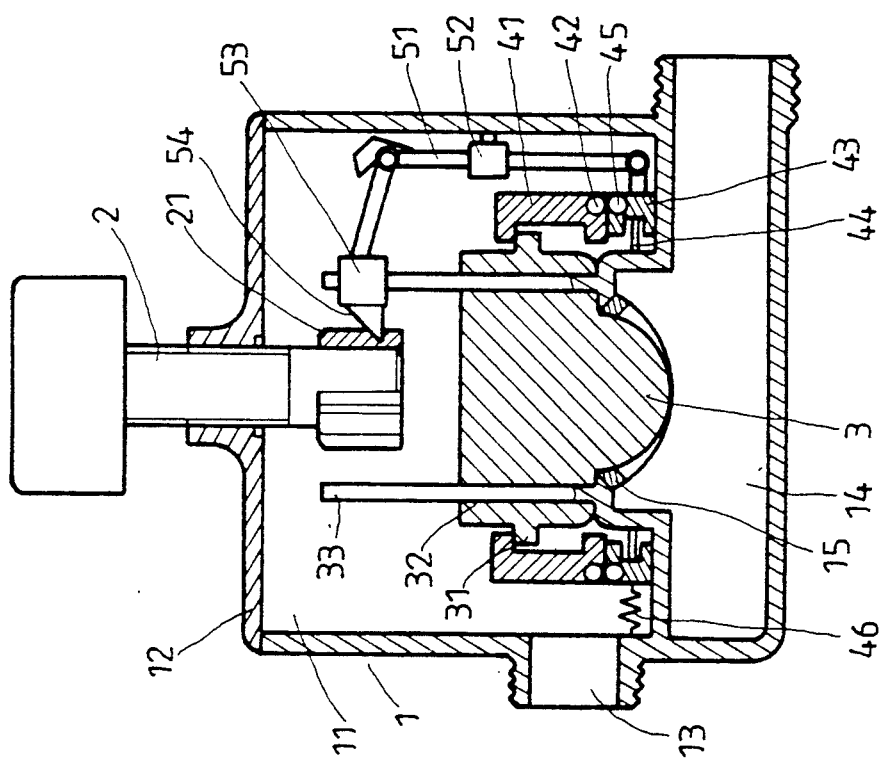
FIG. 1 is a side elevation view in section of a fountain faucet embodying the instant invention of which a float valve is located and further retained in a closed condition.

Referring to FIG. 1, a housing defines a water chamber 11, an inlet 13 communicating the water chamber 11 is formed in a side wall of the housing 1 and in communication with a water supply tube (not shown). An outlet tube 17 defined by a partition 18 and a bottom wall of the housing 1 is formed in a lower portion of the housing 1. A plateform 181 is provided in a central region of the partition 18 and an opening 14 in the plateform portion 181 places the outlet tube 17 in communication with the water chamber 11. A valve seat 15 made of a resilient material such as rubber is mounted around the opening 14. Two uprise guiding legs 33 are provided on the plateform portion 181. A float valve 3 normally seats on the valve seat 15 to water tightly close the opening 14 and is formed with two bores 32 for mounting the float valve 3 to the guiding legs 33 in a way that relative to the guiding legs 33.

An operating knob 20 is integrally mounted on top of a control spindle 2 which is an ordinary part and well-known in construction to extend through the top wall 12 of the housing 1 and be threaded to move axially downwardly towards the float valve 3 mounting on the guiding legs 33. The float valve 3 is integrally and circumferentially formed with a flange 31.

A release device includes a pinion 21 mounted to a lower end of the spindle 2 remote from the operating knob 20, a crane-like actuating device having a vertical post 51, a jib or actuating arm 54 projecting radially towards the control spindle 2 and hingedly attached to top end of the vertical post 51, a circular base member 43 resting on the partition 18 and loosely surrounding the plateform portion 181 and a connection arm 55 with one end hingedly attached to bottom end of the vertical post 51 and another end attached to outer side wall of the circular base member 43, a holder 52 attached to an interior of a side wall of the housing 1 and extending therethrough an axial bore (not shown) in which the vertical post 51 is mounted for rotary motion only.

Figure 2:
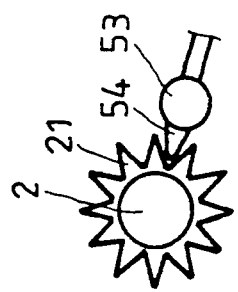
FIG. 2 is a bottom elevation view of a pinion and an actuating are to be used in the fountain faucet.
Figure 3:
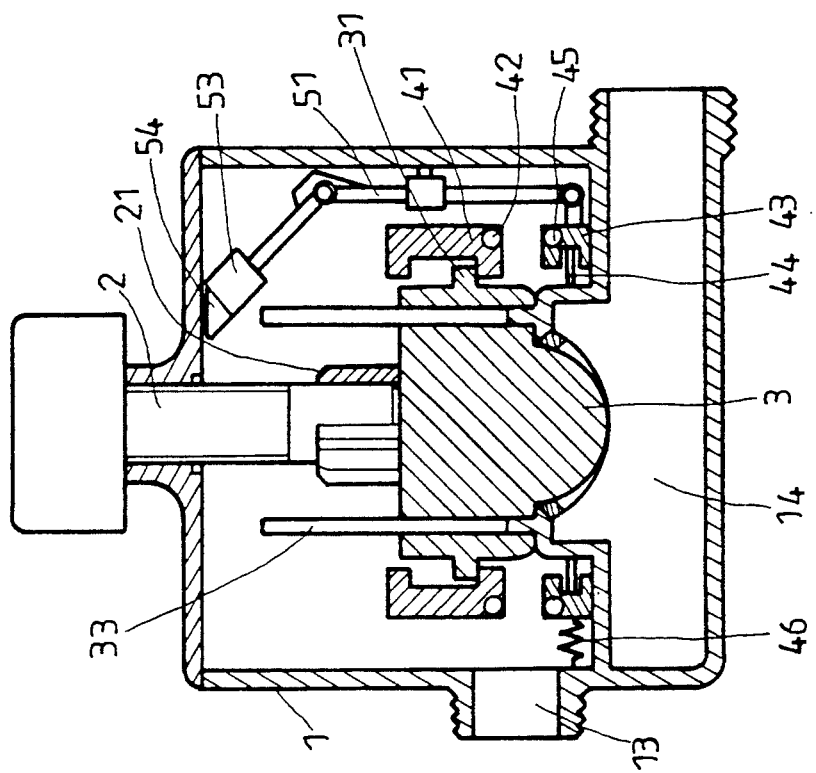
FIG. 3 is a side elevation view in section of the fountain faucet shown in FIG. 1 of which the float valve is located in its opening position.
Figure 4:
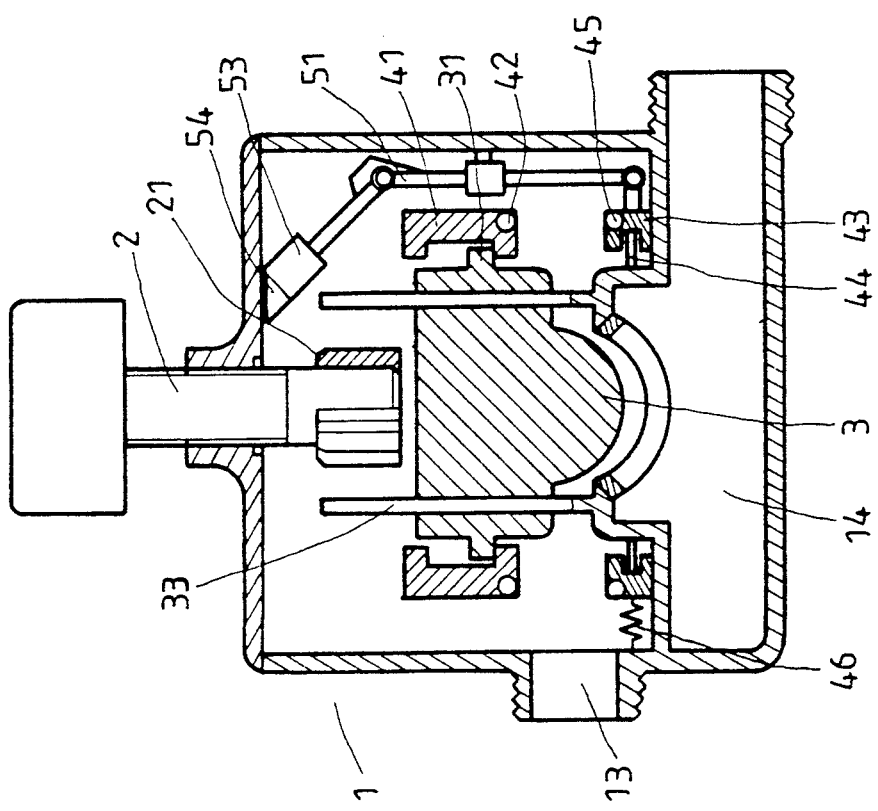
FIG. 4 is a side elevation view in section of the fountain faucet wherein the float valve is retained in its closed position by a control spindle.

The actuating arm 54 is swingable relative to the vertical post 51 between a lower engaging position, as best shown in FIG. 1, and an upper disengaging position, as best shown in FIG. 3. The actuating arm 54 has a sharp head extending into adjacent teeth of the pinion 21, as best shown in FIG. 2, when the actuating arm 54 is located in its lower engaging position. A float 53 is secured to the actuating arm 54 for conducting swinging movement of the actuating arm 54 along with rising or decreasing water level in the water chamber 11. Coil springs 46 are arranged between interior of the side wall of the housing 1 and outer side wall of the circular base member 43 to restore automatically the circular base member 43 after the base member 43 being displaced from its ordinary position, as best shown in FIGS. 1, 3 and 4.

A valve retaining device includes a valve retainer 41 which is an annular float loosely surrounding the float valve 3 and normally resting on top of the base member 43 for retaining the float valve 3 in its closed position and magnets 42, 45 respectively secured in adjcent side walls of the annular float 41 and base member 43 for retaining the annular float 41 in position by means of magnetic attraction. The annular float 41 is formed with internal flanges 411, 412 which are axially spaced and integrally formed on the interior of a circumferential side wall of the annular float 41 and so dimensioned to be engageable with the flange 31 of the float valve 3 so as to confine axial or vertical movement of the float valve 3 between its valve closed position, as best shown in FIG. 1, and valve open position, as best shown in FIG. 3.

As shown in FIG. 1, water supply is shut off and the float valve 3 is in closed position such that the opening 14 do not communicate the water chamber 11 and the outlet tube 17 and the float valve 3 effectively prevent the flow of water through the faucet 1. The float valve 3 is further retained in this closed position by the retainer 41 which is attached to the base member 43 by means of magnetic attraction between the magnets 42, 45. Even though that the operating knob 20 of the faucet 1 is left at its opening position, any water supply through the inlet 13 to the faucet 1 may still be shut off and no water may run to waste.

In opening operation of the faucet 1, simply turning the operating knob 20 to thread the spindle 2, as best shown in FIG. 2, the actuating arm 54 is driven by the pinion 21 to rotate the vertical post 51. The rotary motion of the vertical post 51 drives the base member 43 to rotate along an annular rail 44 through the connection arm 45 that separates the matching magnets 42, 45 in the valve retainer 41 and base member 43 and interrupts magnetic attraction therebetween. Unlike the fountain faucet disclosed by my U.S. Pat. No. 5,159,950, the valve retainer 41 is thus released from the base member 43 allowing the float valve 3 to float away from its closed position on water in the water chamber 11, as best shown in FIG. 3. The float 53 secured to the actuating arm 54 floats on water in the water chamber 11 to swing the actuating arm 54 from its engaging position into disengaging position.

The faucet 1 with its float valve 3 released from the valve retainer 41, as shown in FIG. 4, can be operated to open simply by threading the operating knob 20 to retract the spindle 2 and the float valve 3 rises to lay open the opening 14 by means of buoyancy.

Figure 5:
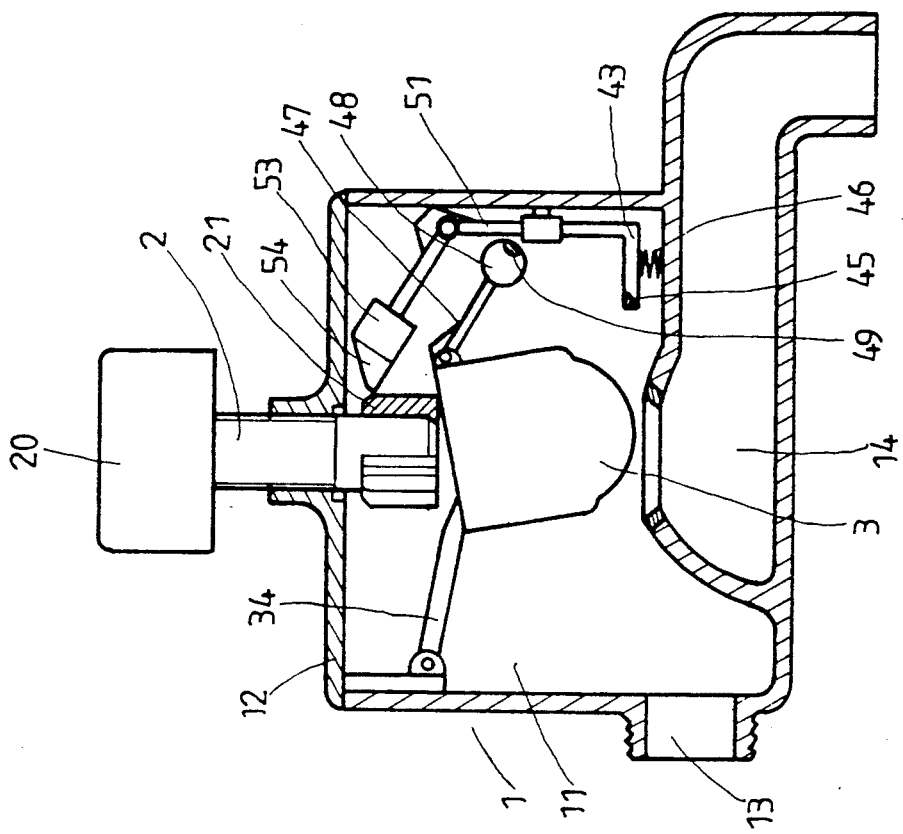
FIG. 5 is a side elevation view in section of a second embodiment of the instant invention.
Figure 6:
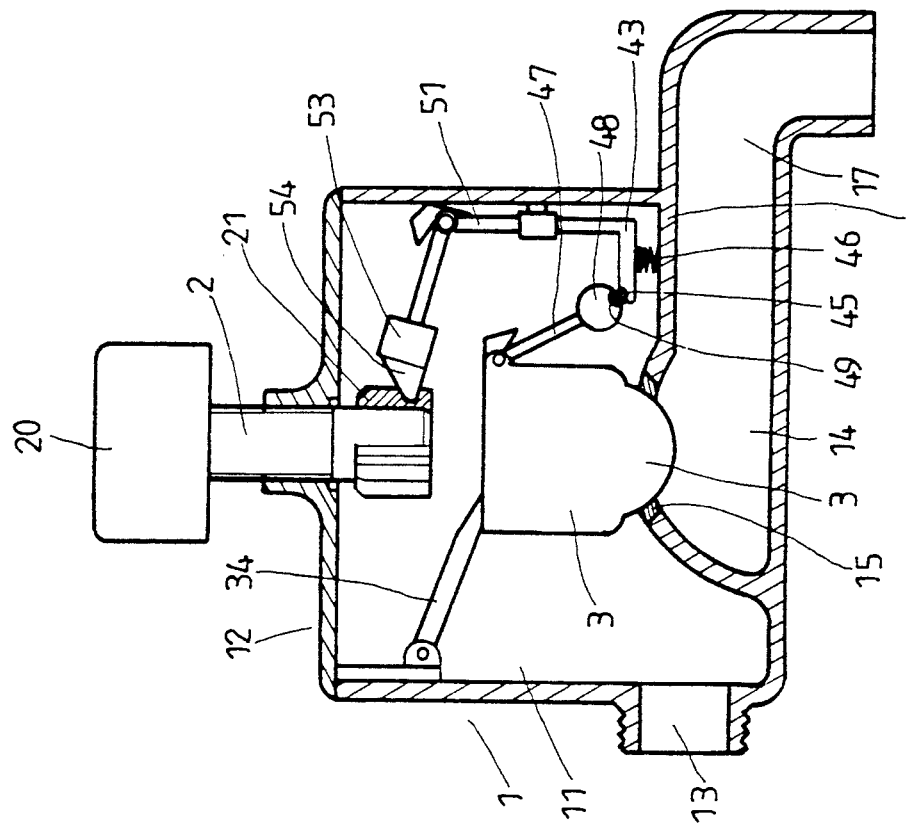
FIG. 6 is a side elevation view in section of the fountain faucet shown in FIG. 5 of which a float valve is located in its opening position.
Figure 7:
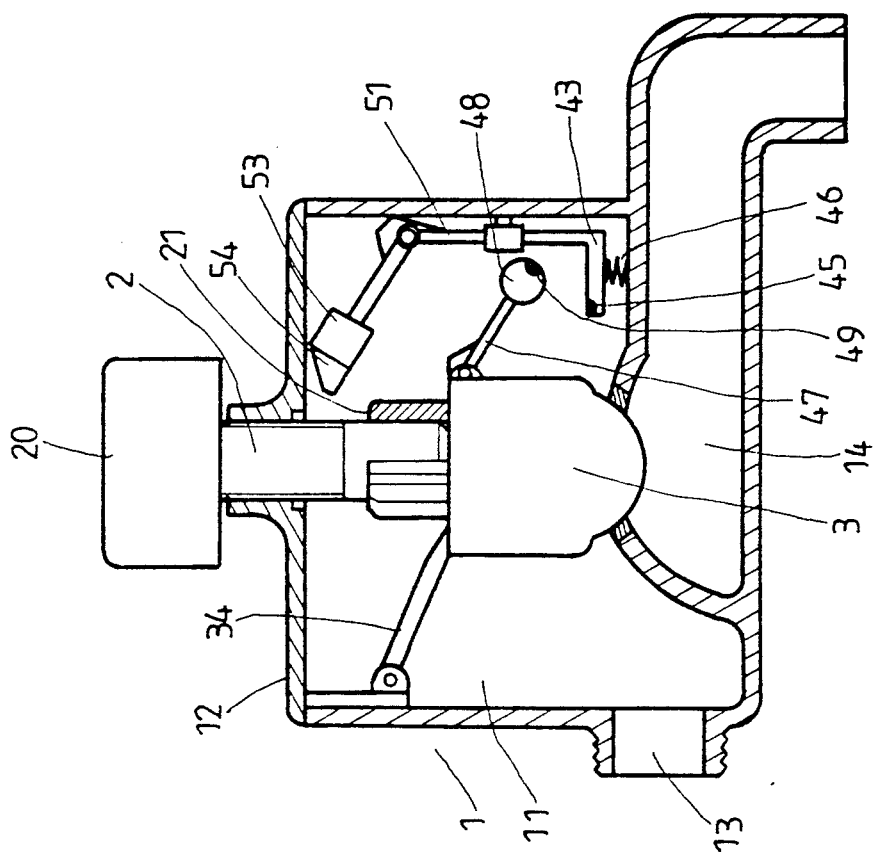
FIG. 7 is a side elevation view in section of the second embodiment wherein the float valve is retained in its closed position by a control spindle

FIGS. 5 to 7 illustrate a second embodiment of a fountain faucet according to the invention which is similar in construction to the first embodiment shown in FIG. 1. A housing 1 defines a water chamber 11, an inlet 13 communicating the water chamber 11 is formed in a side wall of the housing 1 and in communication with a water supply (not shown). An outlet tube 17 defined by a partition 18 and a bottom wall of the housing 1 is formed in a lower portion of the housing 1. An opening 14 in the partition 18 places the outlet tube 17 in communication with the water chamber 11. A valve seat 15 made of a resilient material such as rubber is mounted around the opening 14. A float valve 3 normally seats on the valve seat 15 to water tightly close the opening 14 and is connected at top to one end of an arm 34 of which the other end is hinged to an inner side wall of the housing 1. An operating knob 20 is integrally mounted on top of a control spindle 2 to extend through a top wall 12 of the housing 1 and be threaded to move axially downwardly towards the float valve 3 seating on the valve seat 15. A valve retaining device includes a float 48 mounted to a rod 47 which is hinged to the top of the float valve 3.

A release device includes a pinion 21 mounted to a lower end of the spindle 2 remote from the operating knob 20, a crane-like actuating device having a vertical post 51, a jib or actuating arm 54 projecting radially towards the spindle 2 and hinged to top end of the vertical post 51 of which the bottom end bent vertically to form a base 43 resting on the partition 18 through a coil spring 46 and extending radially inwardly towards the float valve 3. Magnets 49, 45 are respectively secured in the float 48 of the valve retaining device and base 43 of the release device so as to retain the float 48 in position by means of magnetic attraction when no water in the water chamber 11, as best shown in FIG. 5.

Similar to the first embodiment, when water supply is shut off, the float valve 3 is located in its closed position and further retained by the float 48 of the valve retaining device in a way that the float 48 is attached to the base 43 of the release device by means of magnetic attraction generated between the matching magnets 49, 45. Sequentially, the float 48 of the valve retaining device is released from the base 43 allowing the float valve 3 to float away from its closed poisition to lay open the opening 14 with the assistance of the float 48 and rod 47, as best shown in FIG. 6.

Similar to a variety of known fountain faucets in operation, the faucet 1 of the second embodiment with its float valve 3 released from the float 48 and rod 47 of the valve retaining device, as shown in FIG. 7, can be operated to be shut off simply by threading the operating knob 20 to drive the spindle 2 axially downwardly towards the float valve 3 that eventually restores the float valve 3 to its closed position. The float valve 3 is further retained in this closed position by the spindle 2 of which the bottom end is placed against the float valve 3.

I claim:

1. A fountain faucet for automatically shutting off the water flow from a pipe comprising a housing defining a water chamber and having an inlet communicating the water chamber and an outlet communicating the water chamber through an opening, guiding means disposed in the water chamber, a buoyant closure member mounted on the guiding means for a movement along an axial direction between a closed position where water flow through the opening to the outlet is blocked and an open position where the water chamber is in communication with the outlet, a flange member integrally formed on an outer circumference of the buoyant closure member, a valve seat made of a resilient material and mounted around the opening communicating the water chamber and outlet for a water-tight closure between the buoyant closure member and opening, a control member operably movable along the axial direction between a first position to engage and retain the buoyant closure member in its closed position and a second position allowing the buoyant closure member to move freely between its closed and open positions when the control member is out of engagement with said closure member and having a spindle threadingly engaged in a top wall of the housing with a first end protruding outwardly from the top wall of the housing for mounting an operating knob and a second end extending inwardly into the water chamber, a first annular member surrounding the buoyant closure member and formed with axially spaced internal flange members on an internal circumference thereof for engaging the flange member on the buoyant closure member and movable substantially axially between a first position where the buoyant closure member is placed in its closed position and a second open position, release means disposed in the water chamber and having a pinion mounted on the second end of the spindle and an actuating device including a post disposed parallel to the spindle, a holder attached to an inner side wall of the housing for supporting the post in an axially turnable condition, an arm with a first end extending radially inwardly towards the spindle and a second end hinged to a first end of the post for a swinging movement between a first position where the first end of the arm extends into a space between two adjacent teeth of the pinion and a second position where the first end of the arm is disengaged from the adjacent teeth of the pinion and positioned above the pinion a second annular member mounted on a circular rail under the first annular member allowing a rotary movement between a first position and a second position and supporting the first annular member when the first annular member is placed in its first position, magnets respectively secured in the first and second annular members for retaining the first annular member in its first position by a magnetic attraction force generated between the magnets in the first and second annular members when the second annular member is placed in its first position and the magnetic attraction force is interrupted when the second annular member is shifted into its second position and away from the first annular member and means interconnecting a second end of the post opposite to the first end thereof and the second annular member for shifting the second annular member from its first position into its second position when driven by the actuating device which is driven to rotate by the control member when the arm is placed in its first position.

2. A fountain faucet as claimed in claim 1, wherein a buoyant member is secured to the first end of the arm of the actuating device for swinging the arm from its first position into second position by buoyancy.

3. A fountain faucet as claimed in claim 1, wherein the first annular member is preferably made of buoyant material.

4. A fountain faucet as claimed in claim 1, wherein coil springs are provided between inner side walls of the housing and second annular member and biased to automation by restore the second annular member from its second position into first position.

5. A fountain faucet for automatically shutting off the water flow from a pipe comprising a housing defining a water chamber and having an inlet communicating the water chamber and an outlet communicating the water chamber through an opening, a buoyant closure member disposed in the water chamber and hinged at a first side thereof for a swinging movement between a closed position where water flow through the opening to the outlet is blocked and an open position where the water chamber is in communication with the outlet, a valve seat made of a resilient material and mounted around the opening communicating the water chamber and outlet for a water-tight closure between the buoyant closure member and opening, a float-rod having a first end mounted with a float and a second end hinged to a second side of the buoyant closure member opposite to the first closed side thereof to swing the float between a first position and a second open position, a control member operably movable between a first position to engage and retain the buoyant closure member in its closed position and a second position allowing the buoyant closure member to swing freely between its closed and open positions when the control member is out of engagement with said closure member and having a spindle threadingly engaged in a top wall of the housing with a first end protruding outwardly from the top wall of the housing for mounting an operating knob and a second end extending inwardly into the water chamber, release means disposed in the water chamber and having a pinion mounted on the second end of the spindle and an actuating device including a post disposed parallel to the spindle, a holder attached to an inner side wall of the housing for supporting the post in an axially turnable condition, an arm with a first end extending radially inwardly towards the spindle and a second end hinged to a first end of the post for a swinging movement between a first position where the first end of the arm extends into a space between two adjacent teeth of the pinion and a second position where the first end of the arm is disengaged from the adjacent teeth of the pinion and positioned above the pinion; and a base member integrally attached to a second end of the post opposite to the first end thereof for supporting the float when the float is in its second position and magnets respectively secured in the float and the base member of the actuating device for retaining the float in its second position by a magnetic attraction force which is arranged to be interrupted by a separating movement conducted by threading the control member to drive the actuating device to rotate so that the arm is placed in its first position resulting seperation of the magnet in the float from the magnet in the to enable the closure member to swing to the open position base member to release the float attaching to the end of the float-rod.

* * * * *